(12) United States Patent
Soufiane

(10) Patent No.: US 6,608,956 B2
(45) Date of Patent: Aug. 19, 2003

(54) DUAL-CLAD POLARIZATION-PRESERVING OPTICAL FIBER

(75) Inventor: Abdelouahed Soufiane, Boston, MA (US)

(73) Assignee: Verrillon Inc., North Grafton, MA (US)

( * ) Notice: Subject to any disclaimer, the term of this patent is extended or adjusted under 35 U.S.C. 154(b) by 12 days.

(21) Appl. No.: 09/923,230

(22) Filed: Aug. 3, 2001

(65) Prior Publication Data

US 2002/0126972 A1 Sep. 12, 2002

Related U.S. Application Data

(60) Provisional application No. 60/275,056, filed on Mar. 12, 2001.

(51) Int. Cl.[7] .................................................. G02B 6/22
(52) U.S. Cl. ...................... 385/127; 385/11; 385/123; 385/125; 385/126
(58) Field of Search ..................... 385/127, 126, 385/125, 11, 123; 65/403

(56) References Cited

U.S. PATENT DOCUMENTS

| | | | |
|---|---|---|---|
| 4,274,854 A | 6/1981 | Pleibel et al. ..................... 65/2 |
| 4,630,889 A | * 12/1986 | Hicks, Jr. .................... 385/123 |
| 4,815,079 A | 3/1989 | Snitzer et al. .................. 372/6 |
| 4,896,942 A | 1/1990 | Onstott et al. ............ 350/96.33 |
| 4,913,521 A | 4/1990 | Tajima et al. ............. 350/96.33 |
| 5,373,576 A | 12/1994 | Minns et al. ................ 385/125 |
| 5,864,645 A | 1/1999 | Zellmer et al. .............. 385/126 |
| 5,933,271 A | 8/1999 | Waarts et al. ............... 359/341 |
| 5,949,941 A | * 9/1999 | DiGiovanni ................ 385/127 |
| 6,043,930 A | 3/2000 | Inagaki ....................... 359/341 |
| 6,115,526 A | 9/2000 | Morse ......................... 385/125 |
| 6,157,763 A | 12/2000 | Grubb et al. ................ 385/126 |

FOREIGN PATENT DOCUMENTS

| | | | |
|---|---|---|---|
| EP | 0 319 319 | 6/1989 | ............. G02B/6/10 |
| EP | 0484659 | 5/1992 | ......... C03B/37/012 |
| EP | 0918382 | 5/1999 | ............. H01S/3/06 |
| JP | 61215225 | 9/1986 | ......... C03B/37/014 |
| JP | 63106518 | 5/1988 | ........... G01C/19/64 |

\* cited by examiner

*Primary Examiner*—Audrey Chang
*Assistant Examiner*—Denise S. Allen
(74) *Attorney, Agent, or Firm*—Testa, Hurwitz & Thibeault, LLP

(57) ABSTRACT

A polarization-preserving optical fiber with a high pump-radiation absorption efficiency including a core, a primary cladding surrounding the core, stress members disposed within the primary cladding, and a secondary cladding surrounding the core, primary cladding and stress members. The stress members and the primary cladding have different thermal responses, thereby inducing birefringence within the fiber. The cladding and stress members cooperate to direct light, propagating through the fiber, into the core.

13 Claims, 1 Drawing Sheet

DUAL-CLAD POLARIZATION-PRESERVING OPTICAL FIBER

CROSS-REFERENCE TO RELATED APPLICATIONS

This application claims the benefits of U.S. Provisional Application No. 60/275,056, filed on Mar. 12, 2001, the entire disclosure of which is hereby incorporated by reference.

FIELD OF THE INVENTION

The invention relates generally to optical fibers and more specifically to optical fibers that maintain the polarization of the incident radiation.

BACKGROUND OF THE INVENTION

Presently, optical fibers are used as laser devices in a variety of applications. A fiber produces a lasing effect when light introduced into the fiber interacts with a doped core. As light passes through the core it stimulates the dopants and is amplified. The core is typically surrounded by a pure silica inner cladding having a refractive index less than that of the core, and an outer cladding having an index of refraction less than that of the inner cladding. Therefore, the refractive indices of the layers decrease moving from the core to the outer cladding. This profile causes light pumped into the fiber to be internally reflected within the inner cladding.

Laser fibers may be core-pumped or cladding-pumped, depending on where the source light is introduced. In the latter case, light directed into the cladding (e.g., from the side of the fiber) is reflected into the core to cause lasing. To increase the amount of light that interacts with the core, thereby increasing pumped-light absorption efficiency, the inner cladding may be polygonally (as opposed to circularly) shaped. The non-circular inner cladding causes ray distortion and mode mixing of the incident light, thereby causing the rays to interact with the core more frequently than would be the case in a circular configuration. A circular inner cladding causes light to be continuously reflected in a helical path within the circular cladding and around—rather than into—the core.

In some applications, it is important to preserve the polarization of the incident light. For example, various devices (e.g., Raman amplifiers pumped by multiple lasers) require a polarized light signal, so fiber conducting light to such a device should retain the original polarization of the source signal.

Single-mode polarization-preserving fibers generally rely on asymmetrical features of the fiber to maintain the polarization of the input light. In these fibers, two orthogonally polarized modes propagate in the fiber, and the asymmetry of the fiber maintains their polarization. One example of this asymmetry, illustrated in FIG. 1, utilizes an elliptically shaped core 160 disposed within a circular cladding 170. An alternative approach to maintaining polarization is to induce birefringence in the fiber by stressing the cladding in one direction. The component polarized in the direction in which stress is induced is slowed to the point of being eliminated, while the other component is allowed to propagate through the fiber. For example, a linearly polarized incident light decomposes into both x and y polarizations as it propagates down the fiber. Stressing the fiber in the x direction will slow one of the components to the point of virtual elimination. Therefore, the polarization of the incident light is preserved at the end of the fiber.

SUMMARY OF THE INVENTION

The present invention relates to preserving the polarization characteristics of the incident light and increasing the pumped-radiation absorption efficiency—the amount of absorbed light that interacts with the core—by controlling the shape of the cladding and stress members and their positions relative to each other and the core.

In one aspect, the invention relates to an optical fiber including a lasing core that carries radiation. The core has index of refraction $n_c$. Additionally, the fiber includes a primary cladding with an index of refraction $n_{pc}$ that surrounds the core, a secondary cladding with an index of refraction $n_{sc}$, that surrounds the primary cladding. Within the primary cladding a pair of stress members, each with an index of refraction $n_{sm}$, are disposed on opposite sides of the core. The relationships among the indices of refraction are as follows: $n_c > n_{pc} > n_{sc}$ and $n_{pc} > n_{sm}$. Additionally, the stress members have a coefficient of thermal expansion different from that of the primary cladding. This difference induces birefringence within the fiber. Each of the stress members has a flat surface facing the core and the flat surface of the other stress member. Furthermore, the primary cladding has a pair of opposed flat surfaces substantially perpendicular to the stress-member flat surfaces. The stress-member flat surfaces and the primary cladding flat surfaces cooperate to reflect light into the core as it propagates through the fiber.

In one embodiment, the stress-member flat surfaces have a length at least equal to the core diameter. In a further embodiment, the cladding flat surfaces have a width dimension at least equal to the core diameter. In yet a further embodiment, the stress-member flat surfaces are separated by a distance, and the cladding flat surfaces at least span this distance. The stress members may be solid or fluid (i.e., a liquid, gas, or gel).

In another aspect, the present invention relates to a method of maintaining polarization and improving pump-energy efficiency including the step of providing an optical fiber that has a lasing core, a non-circular primary cladding, a secondary cladding, and a pair of stress members disposed within the primary cladding on opposite sides of the core. The primary cladding and the stress members have different coefficients of thermal expansion, thereby resulting in birefringence within the primary cladding. Additionally, the method includes the step of radially pumping polarized light into the fiber. The birefringence within the primary cladding preserves the polarization of the pumped light, and the non-circular cladding directs the light at the core as the light propagates down the fiber.

In one embodiment, each of the stress members has a flat surface that faces the core. In a further embodiment, the primary cladding has a pair of opposed flat surfaces that are substantially perpendicular to the stress-member flat surfaces, thereby cooperating to direct pumped light at the core. In yet a further embodiment, the core has an index of refraction $n_c$, the primary cladding has an index of refraction $n_{pc}$, the secondary cladding has an index of refraction $n_{sc}$, and the stress members have an index of refraction of $n_{sm}$. The relationships among the indices of refraction are $n_c > n_{pc} > n_{sc}$ and $n_{pc} > n_{sm}$.

BRIEF DESCRIPTION OF THE DRAWINGS

The invention is pointed out with particularity in the appended claims. The advantages of the invention may be better understood by referring to the following description taken in conjunction with the accompanying drawing in which:

DESCRIPTION OF THE INVENTION

Figure 1:
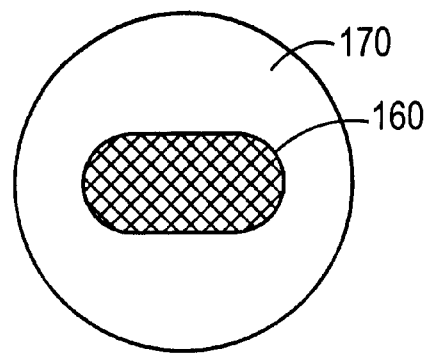
FIG. 1 is a cross-sectional view of a prior-art polarization-preserving optical fiber.
Figure 2:
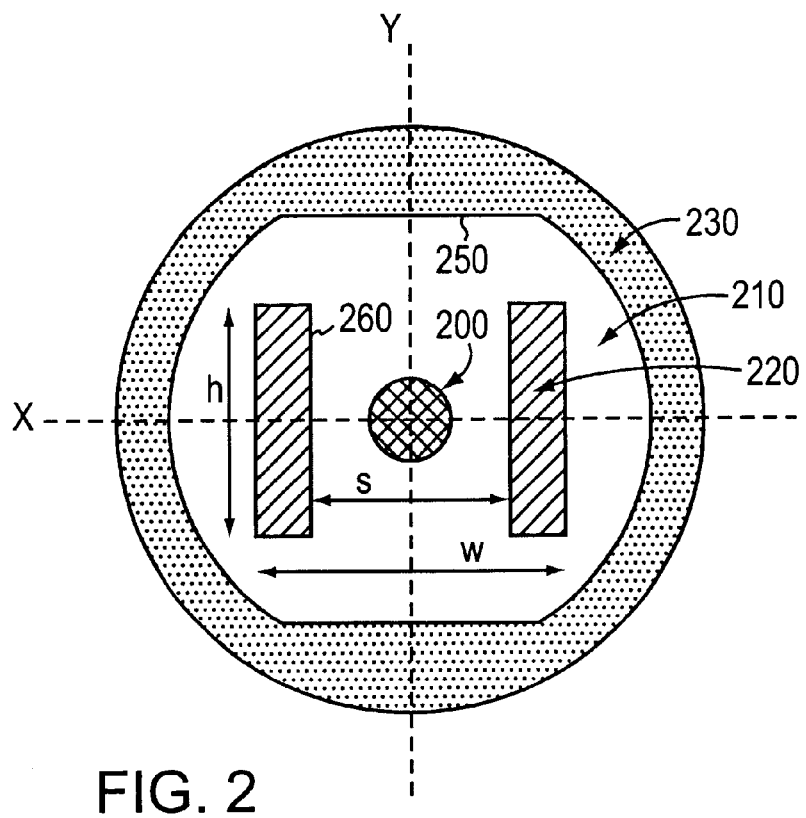
FIG. 2 is a cross-sectional view of an embodiment of the present invention.

With reference to FIG. 2, in one embodiment, an optical fiber of the present invention includes a core 200, a primary cladding 210 concentrically surrounding core 200, a pair of opposed stress members 220 within primary cladding 210 and which straddle core 200, and a secondary cladding 230 concentrically surrounding primary cladding 210. Core 200 is typically composed of a silica-based glass doped with a lasing material such as, but not limited to, $GeO_2$, $P_2O_5$, $TiO_2$, $B_2O_3$, or fluorine. Core 200 has an index of refraction $n_c$ associated therewith. Typically, primary cladding 210 is composed of an undoped silica-based glass having an index of refraction $n_{pc}$, which is less than that of core 200. Primary cladding 210 also has a coefficient of thermal expansion $\sigma_{pc}$ associated therewith. Primary cladding 210 is shaped to define two flat surfaces 250 on opposite sides of core 200, each surface 250 having a length W. Disposed within primary cladding 210 is a pair of stress members 220, each having an index of refraction $n_{sm}$, which is less than that of primary cladding 210, and a coefficient of thermal expansion $\sigma_{sm}$ which is not equal to that of primary cladding 210. Stress members 220 each have a flat surface 260 of height H. Surfaces 260 are disposed substantially perpendicular to primary cladding flat surfaces 250, facing each other on opposite sides of core 200 and separated by a distance S. Secondary cladding 230 is typically composed of a low index polymeric material or a low index glass composition. Secondary cladding 230 has an index of refraction $n_{sc}$ which is less than those of both core 200 and primary cladding 210. In summary the relationships among the refractive indices and the coefficients of thermal expansion are as follows:

$n_c > n_{pc} > n_{sc}$, $n_{pc} > n_{sm}$, and $\sigma_{pc} \neq \sigma_{sm}$.

The difference in thermal response between stress members 220 and primary cladding 210 produces the birefringence that preserves the polarization of the incident signal. The non-circular shape of the primary cladding provides ray distortion to direct the pumped light to core 200 of the fiber. Additionally, stress members 220 provide additional ray distortion, thereby increasing the overall pumped-radiation absorption efficiency.

In effect, cladding flat surfaces 250 and stress-member flat surfaces 260 form a trap to reflect light and direct it toward core 200. To form a perfect light trap, the width W of cladding flat surfaces 250 would be at least as great as the separation distance S between stress-member flat surfaces 260 (in other words, the width of the cladding flat surfaces would span the distance S), and the height H of stress members 260 would be such that stress members 260 reach—i.e., span the distance between—cladding flat surfaces 250. In general this is unrealistic in terms of manufacturability, the possibility of excess birefringence, and the inability to pump from the side of the fiber; that is, at least some separation between stress members 260 and cladding flat surfaces 250 is necessary to permit the entry of side-pumped light into the interior of the fiber.

Thus, the height dimension H is preferably at least equal to the core diameter, but is less than the distance between cladding flat surfaces 250. Moreover, the width W of cladding flat surfaces 250 is also at least equal to the core diameter, and is desirably at least as great as the distance S.

In one particular embodiment, the height H of stress members 220 is 48.44 microns. Core 200 has a diameter of 8.2 microns, and the width W of cladding member flat surfaces 250 are 77.7 microns. Distance S is 29.0 microns, and the diameter of primary cladding 210 is 125 microns. The diameter of secondary cladding 230 is 185 microns.

In operation, pump energy is radially introduced into secondary cladding 230. The pump light passes through to primary cladding 210 where it undergoes multiple internal reflections because the refractive index $n_{pc}$ of primary cladding 210 is greater than that of secondary cladding $n_{sc}$. As the pump light is reflected within primary cladding 210, a portion thereof passes through to core 200. As a result, that portion of the pump light propagates within core 200 because the refractive index of the core $n_c$ is greater than that of primary cladding $n_{pc}$. Within core 200 the pump light causes lasing to occur through interaction with laser dopants within core 200. Together, stress-member flat surfaces 260 and primary-cladding flat surfaces 250 cooperate to reflect pump light into the core 200, thereby improving the pump-energy absorption efficiency.

Stress members 220 and primary cladding 210 have differing coefficients of thermal expansion. As a result, birefringence is created within the fiber. As polarized light propagates through core 200, its polarization is maintained due to this birefringence.

Having shown the preferred embodiments, one skilled in the art will realize that many variations are possible within the scope and spirit of the claimed invention. It is therefor the intention to limit the invention only by the scope of the claims.

What is claimed is:

1. A fiber adapted to maintain polarization with improved pump-energy efficiency, said fiber comprising:
   a. a core for carrying radiation, said core having a refractive index $n_c$;
   b. a primary cladding surrounding said core and having a refractive index $n_{pc}$;
   c. a secondary cladding surrounding said primary cladding and having a refractive index $n_{sc}$;
   d. within said primary cladding, a pair of stress members disposed on opposite sides of said core and having a refractive index $n_{sm}$, wherein:
   e. $n_c > n_{pc} > n_{sc}$;
   f. $n_{pc} > n_{sm}$;
   g. said stress members and said primary cladding have different coefficients of thermal expansion, thereby creating birefringence in said fiber;
   h. said stress members each have a flat surface facing said core, said stress-member flat surfaces being opposed to each other; and
   i. said primary cladding has a pair of opposed flat surfaces substantially perpendicular to said stress-member flat surfaces, said stress-member flat surfaces and said primary-cladding flat surfaces cooperating to reflect light into said core as it propagates through said fiber.

2. The fiber of claim 1 wherein said core comprises a lasing material.

3. The fiber of claim 1 wherein said core has a diameter and said stress-member flat surfaces have a height dimension at least equal to said core diameter.

4. The fiber of claim 3 wherein said cladding flat surfaces have a width dimension at least equal to said core diameter.

5. The fiber of claim 4 wherein said stress-member flat surfaces are separated by a distance, said width dimension of the cladding flat surfaces spanning said distance.

6. The fiber of claim 1 wherein said stress members comprise a fluid.

7. The fiber of claim 6 wherein said fluid is a gas.

8. The fiber of claim 6 wherein said fluid is a liquid or a gel.

9. A method of maintaining polarization and improving pump-energy efficiency within an optical fiber comprising the steps of:

providing an optical fiber comprising a lasing core, a non-circular primary cladding, a secondary cladding, and a pair of stress members disposed within said primary cladding on opposite sides of said core and having a different thermal response than said primary cladding, said stress members causing birefringence within said primary cladding; and pumping light radially into said optical fiber, whereby said birefringence maintains a polarization of light propagating through said core, and said non-circular cladding directs said pumped light at said core as said light propagates through said optical fiber.

10. The method of claim 9 wherein each of said stress members have a flat surface facing said core.

11. The method of claim 10, wherein said non-circular primary cladding has a pair of opposed flat surfaces substantially perpendicular to said stress-member flat surfaces, wherein said primary-cladding flat surfaces and said-stress member flat surfaces cooperate to direct said pumped light at said core.

12. The method of claim 11, wherein said core has a refractive index $n_c$, said primary cladding has a refractive index $n_{pc}$, said secondary cladding has a refractive index $n_{sc}$, said stress members have a refractive index $n_{sm}$, wherein $n_c > n_{pc} > n_{sc}$ and $n_{pc} > n_{sm}$.

13. A method of maintaining polarization and increasing pump-energy efficiency within an optical fiber comprising the steps of:

providing an optical fiber comprised of a core for carrying radiation, said core having a refractive index $n_c$, a primary cladding surrounding said core having a refractive index $n_{pc}$, a secondary cladding surrounding said primary cladding having a refractive index $n_{sc}$, and a pair of stress members within said primary cladding and disposed on opposite sides of said core, said stress members having a refractive index $n_{sm}$, wherein (i) $n_c > n_{pc} > n_{sc}$ and $n_{pc} > n_{sm}$, (ii) said stress members and said primary cladding have different coefficients of thermal expansion thereby creating birefringence within said fiber, (iii) said stress members each have a flat surface facing said core, said stress-member flat surfaces being opposed to each other, and (iv) said primary cladding has a pair of opposed flat surfaces substantially perpendicular to said stress-member flat surfaces;

pumping light radially into said optical fiber, whereby said birefringence maintains a polarization of light propagating through said core, and said primary cladding and said stress members direct said pumped light at said core as said light propagates through said optical fiber.

* * * * *